US011028551B2

(12) United States Patent
Savii Costa et al.

(10) Patent No.: US 11,028,551 B2
(45) Date of Patent: Jun. 8, 2021

(54) FOUNDATION FOR A TOWER OF A WIND-TURBINE

(71) Applicant: NABRAWIND TECHNOLOGIES, S.L., Pamplona (ES)

(72) Inventors: Hely Ricardo Savii Costa, Uterga (ES); Ion Arocena De La Rúa, Pamplona (ES); Eneko Sanz Pascual, Pamplona (ES); Arantxa Esparza Zabalza, Pamplona (ES)

(73) Assignee: NABRAWIND TECHNOLOGIES, S.L., Pamplona (ES)

( * ) Notice: Subject to any disclaimer, the term of this patent is extended or adjusted under 35 U.S.C. 154(b) by 79 days.

(21) Appl. No.: 16/688,191

(22) Filed: Nov. 19, 2019

(65) Prior Publication Data
US 2020/0157759 A1   May 21, 2020

(30) Foreign Application Priority Data
Nov. 19, 2018   (ES) ................ ES201831119

(51) Int. Cl.
| | |
|---|---|
| *E02D 27/42* | (2006.01) |
| *E02D 11/00* | (2006.01) |
| *E02D 5/34* | (2006.01) |
| *F03D 13/20* | (2016.01) |
| *E02D 5/22* | (2006.01) |

(52) U.S. Cl.
CPC .......... *E02D 27/425* (2013.01); *E02D 5/223* (2013.01); *E02D 5/34* (2013.01); *E02D 11/00* (2013.01); *F03D 13/22* (2016.05); *E02D 2250/0023* (2013.01)

(58) Field of Classification Search
CPC .............. E02D 24/425; E02D 5/22334; E02D 2250/0023; E02D 11/00; F03D 13/22
See application file for complete search history.

(56) References Cited

U.S. PATENT DOCUMENTS

| | | | | |
|---|---|---|---|---|
| 4,812,080 | A | * 3/1989 | Urquhart et al. | ..... E02B 17/027 405/204 |
| 5,826,387 | A | * 10/1998 | Henderson et al. | .... E02D 27/42 52/295 |
| 2012/0107055 | A1 | * 5/2012 | Baumfalk | ................. E02D 5/40 405/228 |
| 2014/0255106 | A1 | * 9/2014 | Henderson | ................ E02D 5/34 405/256 |
| 2018/0355853 | A1 | * 12/2018 | Sandvad et al. | ........ F03D 80/50 |

FOREIGN PATENT DOCUMENTS

| | | |
|---|---|---|
| EP | 2192238 B1 | 6/2012 |
| EP | 2495370 A1 | 9/2012 |
| EP | 2108836 B1 | 5/2014 |

\* cited by examiner

*Primary Examiner* — Tara Mayo-Pinnock
(74) *Attorney, Agent, or Firm* — Edell, Shapiro & Finnan, LLC (57) ABSTRACT

Foundation for a tower of a wind turbine with at least three columns. The foundation includes a reinforced concrete pile corresponding to each of the tower columns. According to one embodiment the pile includes a bolt cage and a main reinforcement formed by a cylindrical framework made up of horizontal rings interconnected by vertical bars. The bolt cage is arranged inside the main reinforcement radially at a distance of less than 0.1 meters. Each of the piles resides in a hole formed in the ground. Concrete is not poured into the holes until the main reinforcements and bolt cages are placed therein and aligned with one another.

20 Claims, 10 Drawing Sheets

FOUNDATION FOR A TOWER OF A WIND-TURBINE

CROSS-REFERENCE TO RELATED APPLICATIONS

The present application relates to and claims the benefit and priority to Spanish Patent Application No. P201831119, filed Nov. 19, 2018.

FIELD

The present invention relates to a foundation for a wind turbine, which tower is formed by a tubular upper portion and a lower portion made up of at least three columns and their corresponding diagonal braces and horizontal attachments. The attachment of the tower is established on three independent and equidistant foundations, each of which is attached to its corresponding column.

BACKGROUND

The technology relating to the attachment between a tower and its foundation is sufficient described in the state of the art. Foundations basically consist of a large concrete disc which has in the central portion thereof a bolt cage or connection collar (for metal towers) or tendon anchors (for concrete towers). These bolt connections or tendon anchors protrude from the foundation and are used for the connection of the tower (namely with the flange surrounding its lower end for metal towers and with the tensing tendons for concrete towers).

European Patent No. EP2108836 discloses reinforced concrete foundations prepared in situ and having steel parts protruding upwardly above the concrete foundation. While placing the segment of the tower (whether it is a metal or a concrete tower), the steel parts go through the cylindrical segment, constituting the attachment between tower and foundation. In European Patent No. EP2108836, a connection element made with higher quality prefabricated concrete that reduces assembly times is added.

In European Patent No. EP2192238, the particularity is the arrangement of a second set of metal elements at an angle other than 0 degrees with respect to the longitudinal direction of the tower. The second set of metal elements goes through a flange and is fixed to same by means of fixing elements.

Wind turbine foundations are usually gravitational (solution where the stability of the wind turbine is based on the mass of the foundation). Piles are only used in very poor terrains along the contour of the disc to achieve the necessary stability by connecting the foundation to more stable layers of the ground. This operation typically increases the cost of the foundation, since it is necessary to use both the main disc (pile cap which distributes the loads of the tower to piles) and the piles.

Moreover, pile or deep foundation technology is used for many applications, especially in construction. It is a vertical column placed in the ground and on which the element transmitting loads is connected. In the case of foundations, it was developed for foundations in poor, wet, or flooded soils, where surface foundations are not viable due to the low bearing capacity of the terrain or the possibility of generating sinking due to the continued pressure on the terrain over time.

The foundation of structures offshore (jackets) which is anchored to the seabed normally use pile technology in the form of a metal tube. In offshore structures, the attachment between the foundation and the structure is by means of two tubes. One tube is the pile and the other tube is one of the legs of the structure, usually being inserted one in the other and comprising mortar between them.

An example of this is disclosed in European Publication No. EP2495370 which, instead of piling and then connecting the legs of the structure (the piles are larger and the legs are smaller) by means of grouting, swaging, or welding, introduces piles in the ground at the same angle as the legs as a result of sleeves serving as a guide, and U.S. Pat. No. 4,812,080 the bearing structure or jacket of which is anchored in the seabed by means of hollow legs piled in the ground, and described a method for anchoring the legs from an external platform and after having arranged the bearing structure or jacket in the seabed. This is achieved by means of sleeves in the legs and piles which are guided through the inside of sleeves and legs.

International Publication No. WO9616233A1 (also published as U.S. Pat. No. 5,826,387) discloses a foundation with piles to support high towers such as high voltage towers and even wind turbines. The foundation is a hollow concrete cylinder of large dimensions delimited internally and externally by a corrugated metal tube. Inside the concrete a bolt cage is arranged, the bolts of the bolt cage being slidably housed through hollow PVC pipes to prevent adhesion between the bolts and the concrete and thus allowing tensioning thereof.

SUMMARY

Disclosed herein is a manufacturing process of drilling at least three holes in the terrain, introducing a main reinforcement into each of the holes in addition to a bolt cage that is attachable to a flange of a tower, and in a final step pouring concrete on the entire assembly.

The bolt cage and the main reinforcement of the concrete radially are very close to one another, preferably at a distance of less than 0.1 meters, such that when the concrete sets, the two elements are left as if they were physically attached, transmitting in use the tensile loading of the tower. They can also be attached by means of an attachment element prior to pouring the concrete.

The piles forming the foundation are coordinated such that upon connecting the tower with the foundation they are aligned with the tower with metal elements protruding from the foundation (the upper portion of the bolt cage) easily go through the through holes of a flange of the tower.

The advantages of the foundation of the invention are:

The compressive strength of the pile is provided by the sum of the strength of its tip under compression against the lower substrate, plus the friction between the side surface and walls. The tensile strength of the pile is proved exclusively by the friction between the side surface and the walls.

The foundation of the invention is highly cost-competitive for the tower configuration that is considered (a structure comprising columns, diagonal braces, and horizontal braces), since the columns of the tower transmit fundamentally vertical loads, so they do not require any further pile cap which transmits loads to the pile. The resulting piles comprises each one a diameter between 1 and 2 meters and a depth between 20 and 40 meters. The piles therefore are constructed easily and rapidly with specialized machinery available worldwide and very rapidly (one pile a day-one foundation every three days), which allows the installation rate of the wind farm to be very fast.

Moreover, enormous savings in concrete and metallic material are achieved (both in the reinforcement and in the bolt cage). Conventional foundations for a metal tower 160 meters in height uses a volume of concrete of about 600 m³. With the foundations disclosed herein a tower of the same height only requires about 150 m³ of concrete. In addition, the metallic material used in the reinforcement decreases from about 100 tons to about 15 tons and the bolt cage can by reduced to less than one meter in height and to a diameter around one meter.

DETAILED DESCRIPTION

Figure 1:
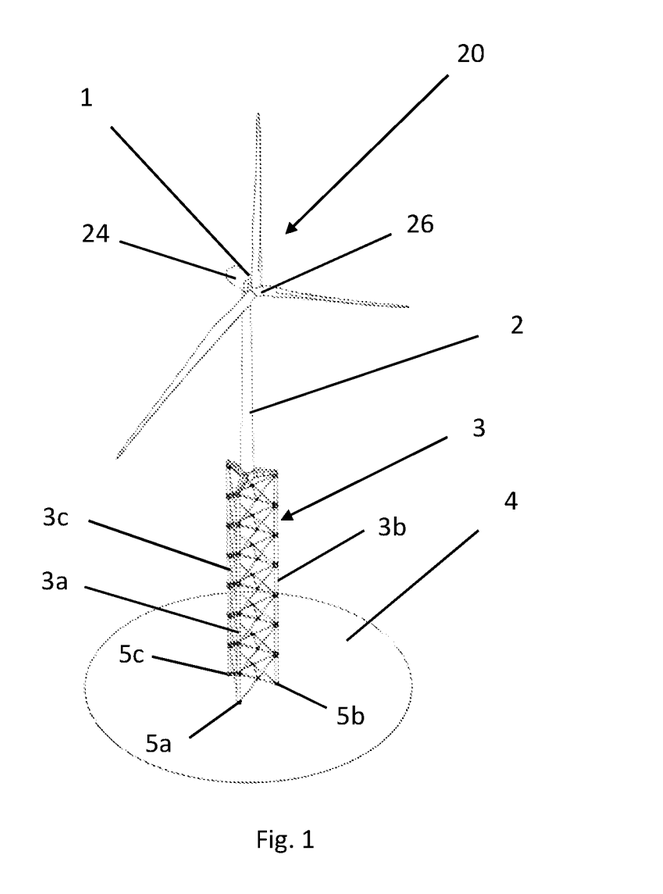
FIG. 1 depicts a wind turbine tower according to one embodiment that is anchored to the ground through the use of a foundation.

FIG. 1 shows a wind turbine tower 20 being supported on piles 5a, 5b and 5c embedded in the ground 4. The upper part of the wind turbine tower includes a nacelle 24, a rotor 26 and blades 1. The tower includes an upper tubular portion 2 and a lower portion formed by a triangular structure comprising three columns 3a, 3b and 3c. According to one embodiment, each of the three columns 3a, 3b and 3c is arranged vertically.

Figure 2A:
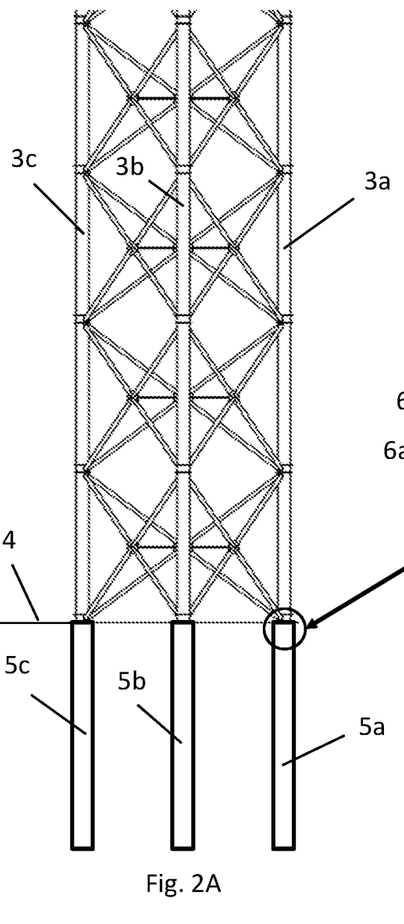
FIG. 2A schematically shows a lower portion of a tower of a wind turbine like that shown in FIG. 1 anchored to piles in the foundation.

FIG. 2A depicts the triangular structure comprising the three columns 3a, 3b and 3c with their lower ends respectively connected to reinforced concrete piles 5a, 5b and 5c that are emplaced in separate holes in the ground 4. The columns may be hollow tubes, solid circular bars or may be constructed to have, for example, IPN, UPN, UPL, IPE, HEA, HEB type profiles.

FIGS. 2B-6B represent examples of tower columns 3a, 3b and 3c that are respectively coupled to or configured to be coupled to each of piles 5a, 5b and 5c. In the description that follows, in some instances reference numbers 3 and 5 are used for the purpose of indicating that the identified features are respectively applicable to each of columns 3a, 3b and 3c and piles 5a, 5b and 5c.

Inside each of piles 5a, 5b and 5c there is arranged a main reinforcement 6 formed by a plurality of horizontal rings 6a that coupled together by vertical bars 6b to form a cylindrical framework extending along substantially the entire length of the pile. As shown in the figures, the vertical central axes of the horizontal rings 6a are concentric with the central vertical axis 15 of the pile.

Each of piles 5a, 5b and 5c also internally comprises a bolt cage 7 arranged inside the main reinforcement 6 in an upper part thereof, and radially spaced a distance d1 of less than 0.1 meters, preferably at a distance between 0.05 and 0.1 meters, away from the main reinforcement 6. When installed in the pile 5, the bolt cage 7 includes a plurality of vertical bars 7a arranged parallel to the vertical bars 6b of the main reinforcement, and the distance d1 is the distance between the vertical bars 7a and vertical bars 6b.

For sake of simplicity and clarity, FIGS. 2B, 3B, 5A and 6A show the arrangement of the various parts of the representative piles assembled inside a hole in the ground 4 without showing the parts encased in concrete. FIGS. 3C, 5B and 6B are partial cross-section views showing the concrete 30.

Figure 3A:
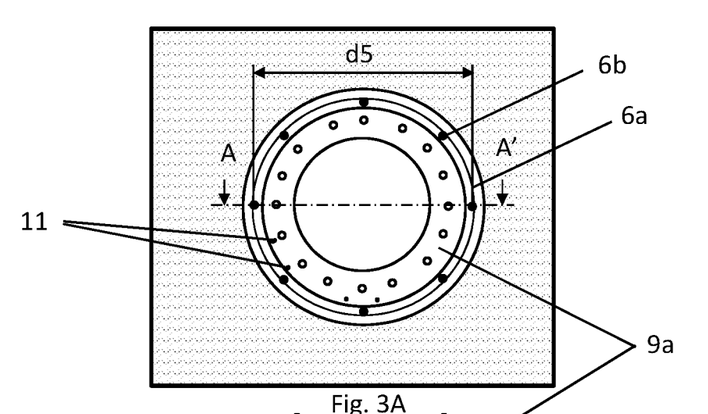
FIG. 3A shows a top view of the attachment of a reinforcement with a bolt cage of the pile shown in FIG. 2B.
Figure 3B:
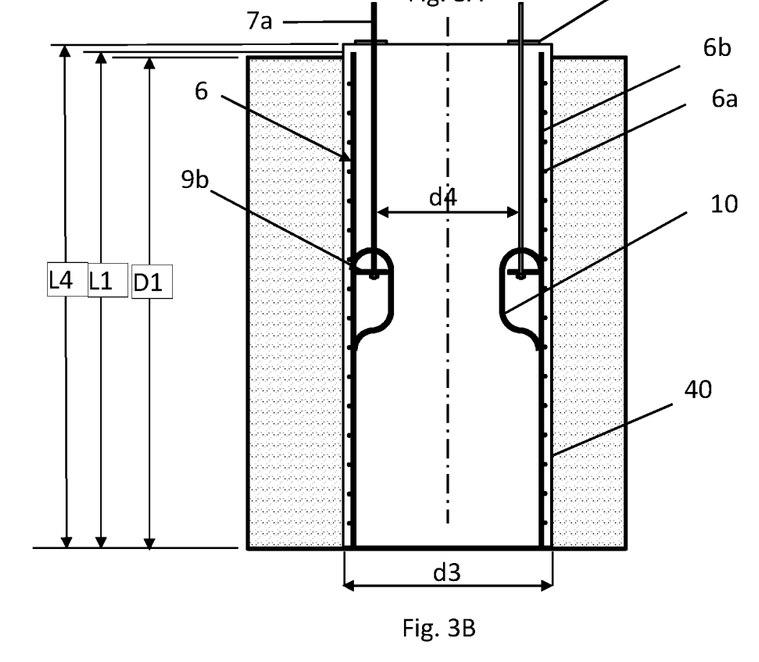
FIG. 3B shows a cross-section according to line A-A' of the attachment of the main reinforcement with the bolt cage of FIG. 3A.

As shown in FIGS. 3A-C, when a pile is fully constructed, each of the main reinforcement 6 and bolt cage 7 is encased within the concrete 30. As a result of the bolt cage 7 being positioned very near the main reinforcement 6, as can be seen in FIG. 3B, when the concrete 30 sets the bolt cage 7 and main reinforcement 6 are left as if they were physically attached, enabling the transmission of the tensile loads generated by the tower in use from the bolt cage 7 to the main reinforcement 6 and finally to the concrete 30. Due to the bolt cage's proximity with the main reinforcement, the concrete absorbs better those tensile loads. As shown in the figures, according to one embodiment the main reinforcement 6 is arranged inside the concrete 30 close to the outer contour of the pile.

According to one embodiment, the length L1 of the main reinforcement 6 is near the same as the depth D1 of the hole 40 in ground 4 where the pile is arranged, as can be seen in FIG. 3B.

Figure 2B:
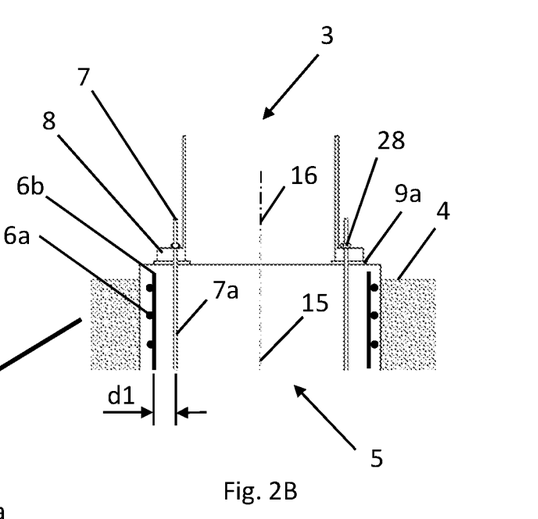
FIG. 2B shows a detail in the form of a cross-section of the anchoring of one of the columns of the wind turbine to one of the piles of the foundation.
Figure 3C:
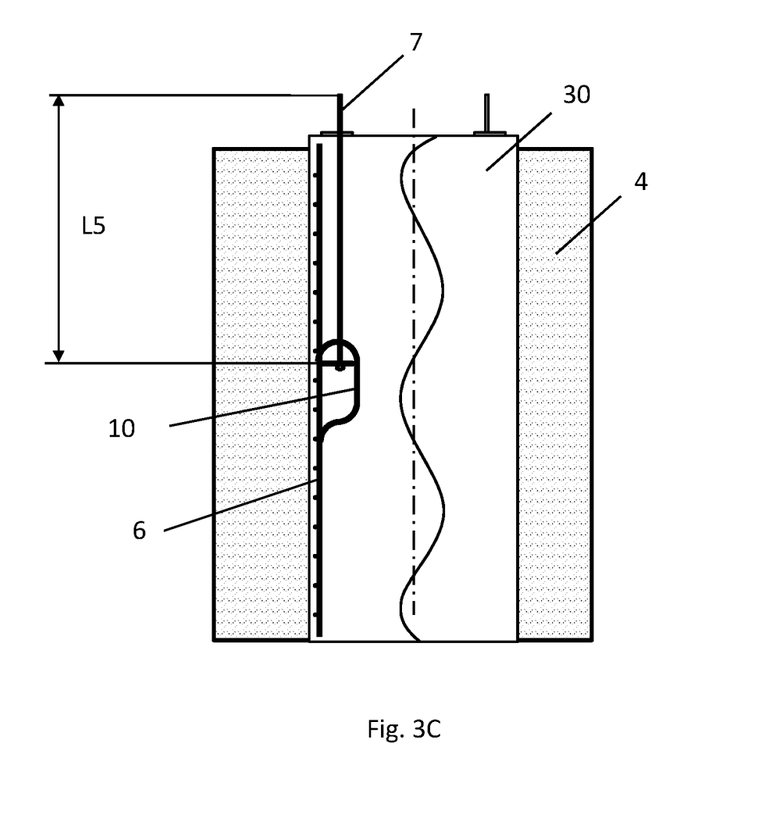
FIG. 3C shows a partial cross-section of the pile of FIG. 3B with the main reinforcement and bolt cage encased in concrete.

The attachment between pile 5 and the corresponding column 3 according to one embodiment can be seen in greater detail in the sectioned detail depicted in FIG. 2B. As shown, the upper portion of the pile 5 protrudes above the level of the ground 4, and a portion of the bolt cage 7 in turn protrudes from the upper portion of the pile 5 such that the portion of the bolt cage 7 protruding from the pile 5 goes through a flange 8 comprised at an end of column 3 of the wind turbine tower.

The upper portion of each bolt cage 7 comprises an upper collar 9a through which metal elements 7a made up of threaded bars pass through. The upper collar 9a is suitable for cooperating with the flanges 8 of the columns of the wind turbine such that the metal elements 7a of the bolt cage 7 protruding from the pile 5 go through the upper collar 9a and the corresponding flanges 8, thereby allowing the fixing or anchoring of the column 3 of the wind turbine to the pile 5.

Nuts 28 or similar means may be mounted on the metal elements 7a of the bolt cage 7 and pressed against the flanges 8 of the wind turbine.

It can be seen in the figures how the upper collar 9a is arranged above the reinforced concrete of the corresponding pile, supported thereon, such that the upper collar 9a is exposed, i.e., it is not buried in concrete and is therefore visible.

The integration of the bolt cage 7 in the pile generates a connection which allows assembly and disassembly of the structures (in this case the tower of the wind turbine) in a reversible manner, a functionality that does not exist in conventional piles used up until now, which are designed for being permanently connected (conventionally through a pile cap) to the structure to be supported.

Optionally, however, the bolt cage 7 and the corresponding reinforcement of each pile can also be attached by means of an attachment element, which is placed before pouring the concrete. According to one embodiment, the bolt cage 7 and the main reinforcement 6 of each pile are attached by means of ties 10 extending between the framework of horizontal rings 6a and vertical bars 6b making up the main reinforcement 6 and a lower collar 9b arranged in the lower portion of the bolt cage 7. The material of the joining ties 10 is preferably metal although other materials are not ruled out.

Figure 3D:
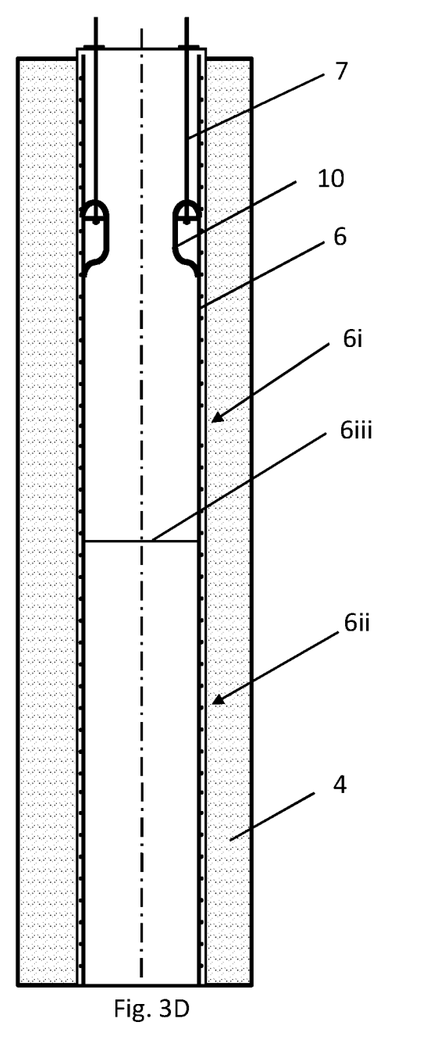
FIG. 3D depicts an embodiment of a main reinforcement that comprises an upper part and a lower part that are coupled together.

Optionally, the main reinforcement 6 of each pile can comprise two portions, a lower half 6ii and an upper half 6i such that when both halves are attached to one another, the complete reinforcement is formed. The attachment 6iii is shown in FIG. 3D. This reinforcement configuration is advantageous when preparing the foundation, as will be described later.

Figure 6A:
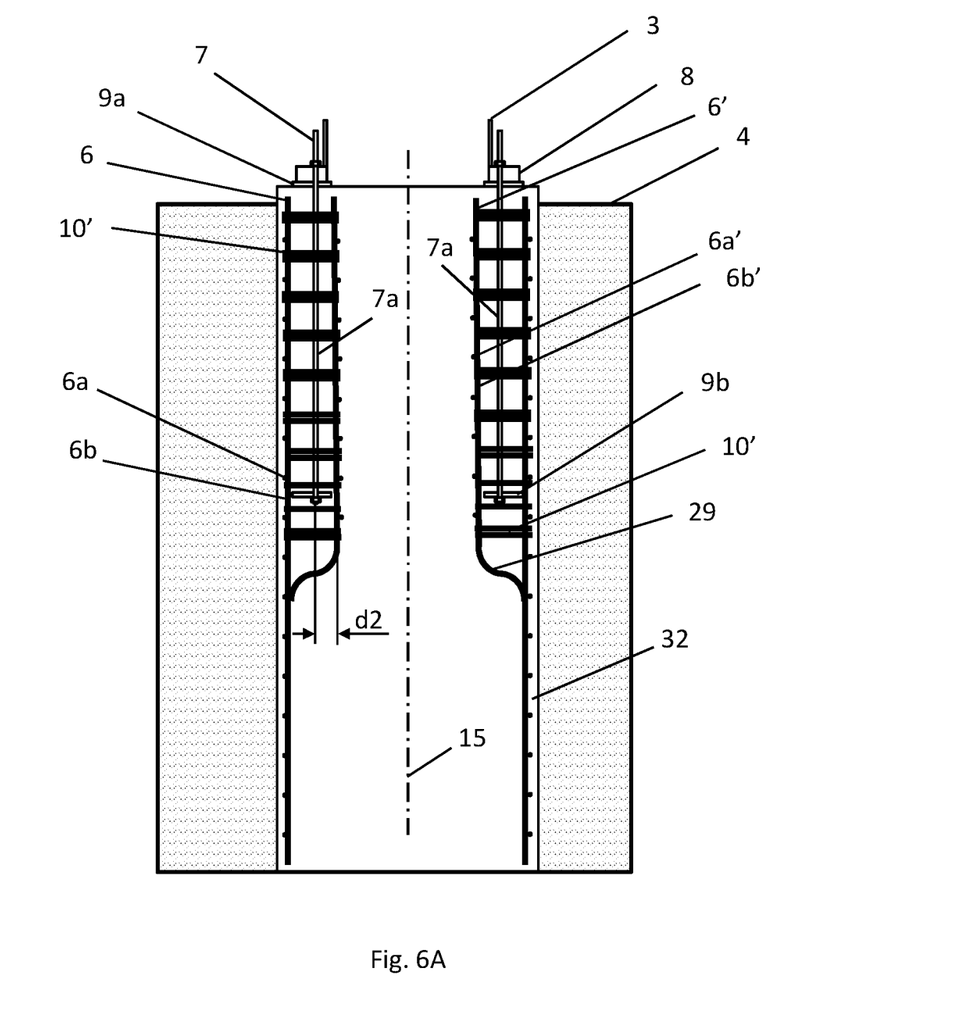
FIG. 6A shows a cross-sectional side view of a pile according to another embodiment.

In a variant, each pile 5 can comprise a secondary reinforcement 6', preferably being formed by vertical bars 6b' and horizontal rings 6a' that form a cylindrical formwork. According to such an embodiment, the secondary reinforcement 6' is arranged inside the bolt cage 7, as shown in FIG. 6A, preferably at a radial distance d2 of less than 0.1 meters from the bolt cage 7. This sandwich arrangement of the bolt cage 7 between the main reinforcement 6 and the secondary reinforcement 6' allows the transmission of tensile loads generated by the tower to be more uniform and efficient, and further increases the rigidity of the set concrete 30.

According to one embodiment, the secondary reinforcement 6' has a length L2, greater than the length L3 of the section of the bolt cage 7 that is embedded inside the concrete 30. According to one embodiment, L2 is about 0.5 meters greater than L3. In addition, according to one embodiment, the length L2 of the secondary reinforcement 6' is less than the length L1 of the main reinforcement 6, and has at its lower end a curved portion 29 at the bottom that is attached to the main reinforcement 6 that continues preferably straight and parallel to the outer contour 32 of the pile. The main reinforcement 6 and the secondary reinforcement 6' are attached by means of joining ties 10', preferably arranged horizontally, which can be arranged alone or in pairs. According to one embodiment, the joining ties 10' are arranged between the vertical bars 6b, 6b' of the main reinforcement 6 and the secondary reinforcement 6', preferably spaced apart equidistantly, as shown in FIG. 6A. The material of the joining ties 10' is preferably metal, but may be made of other materials.

A method for preparing the foundation is as follows. First, the hole 40 is made having a small diameter compared with bores for foundations of the state of the art, and are very deep. In a non-limiting example, the hole 40 has a diameter d3 of 1.5 meters and a depth D1 of 25 meters. Once the hole 40 is completed, the main reinforcement 6 is introduced, placing it on the periphery of the hole 40. Since the holes are deep, according to one variant the main reinforcement 6 may comprise two parts, a lower half 6ii and an upper half 6i. According to such an embodiment, the lower half 6ii of the main reinforcement 6 is first partially placed in the hole 40 and before completely introducing the lower half 6ii in the hole, the upper half 6i of the reinforcement is attached to the lower half 6ii such that the entire reinforcement 6 is attached together forming a single part. The attachment between the lower half 6ii and the upper half 6i may be done by means of welding, reinforcement overlaps, or any other equivalent type of attachment.

FIGS. 3A and 3B show how the upper half of the reinforcement 6 incorporates the bolt cage 7. According to any of the disclosed embodiments, the length L5 of the bolt cage 7 is between 0.8 and 2 meters and the diameter d4 of the bolt cage is less than the diameter d5 of the main reinforcement 6. Therefore, in the preferred embodiment, the length L5 of the bolt cage 7 is less than the length L4 of the pile or of the length L1 of the main reinforcement 6.

Each bolt cage 7 comprises one upper collar 9a and one lower collar 9b that are attached through the threaded bars 7a arranged longitudinally with respect to the axis of the tower, and more specifically, the axis 16 of the corresponding column 3.

Before completing the introduction of the upper portion of the main reinforcement 6 into the hole 40, the bolt cage 7 is placed inside the upper portion. According to one embodiment the diameter of the upper collar 9a is greater than the diameter d3 of hole 40 with an outer diametric portion of the upper collar resting on the ground 4. According to such an embodiment, the bolt cage 7 is suspended by the upper collar 9a, which in turn rests on the ground, centered with respect to the hole 40 of the corresponding pile 5. Optionally, the bolt cage 7 and the main reinforcement 6 are physically attached before pouring the concrete. In this way, the use of auxiliary means to maintain the bolt cage in place during assembly is avoided. According to one embodiment the attachment of the bolt cage 7 to the main reinforcement 6 is performed with the ties 10 described above, which extend between the framework of horizontal rings 6a and vertical bars 6b making up the main reinforcement 6 and the lower collar 9b that houses the threaded bars 7a of the bolt cage 7. Optionally, the ties 10 may comprise welding points to produce the attachment.

With the intention of making easier the assembly of the main reinforcement 6 and the bolt cage 7, according to one embodiment the main reinforcement and bolt cage are attached together through the ties 10 outside the hole 40 as a pre-assembly, which allows inserting simultaneously the entire assembly into the hole before pouring the concrete 30.

The upper collar 9a comprises through holes 11 to facilitate the fixing of leveling elements.

Figure 4A:
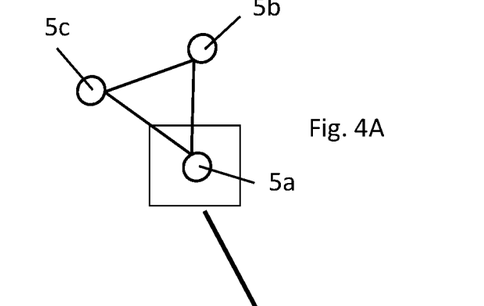
FIG. 4A depicts a foundation comprising three piles.
Figure 4B:
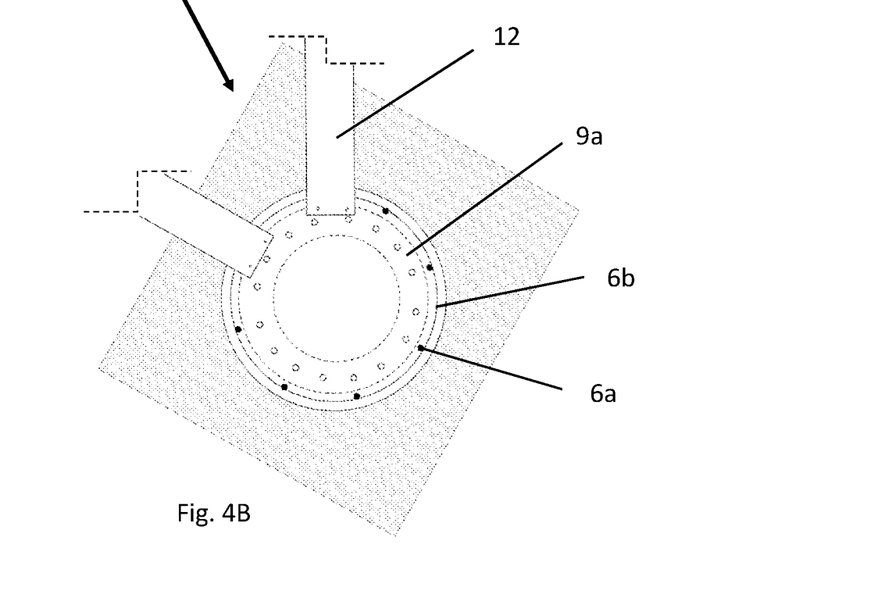
FIG. 4B is a top view of one of the piles of FIG. 4A with attachment elements coordinating its attachment to the other two piles.

The concrete is not poured until the three holes 40 are made and until the main reinforcement 6, and the secondary reinforcement 6' in the case of a double reinforced pile, and the cages 7 are placed in each hole. The pouring of the concrete 30 is completed when the three bolt cages 7 are aligned with each other, i.e when the relative position between them has been coordinated, protruding the same distance and parallel to the axis of the tower of the wind turbine, since it must be assured at all times that there are no assembly problems when the tower is "fitted", where "fitted" is understood to mean the operation of attaching the tower to the foundation. To achieve this, leveling elements are anchored on the upper collars 9a through the through holes 11. According to one embodiment, the leveling elements are beams or plates 12 arranged at 60 degrees which extend to adjacent upper collars 9a, forming an equilateral triangle, as shown in FIGS. 4A and 4B. However, in a variant, the level elements may be mechanical-optical measuring instruments, such as a theodolite. In this sense, a theodolite would be temporarily placed on each upper collar 9a so that the equilateral triangle that should be formed by the three bolt cages 7 is defined in the space.

Once the assembly process has ended, concrete is poured in each hole 40 of the ground 4 such that when the concrete sets, a pile is generated in each hole. Total assembly times are therefore reduced, and savings in materials are produced since less concrete is required for the pile foundation compared with foundations in the state of the art, and less material is also used for making the bolt cage 7 since large bolt cages are not necessary.

Once the concrete of each pile 5 has set, the leveling elements, i.e the mechanical-optical measuring instruments or the beams or plates 12 keeping the bolt cages 7 of each pile 5 of the foundation attached and aligned are removed.

Figure 5A:
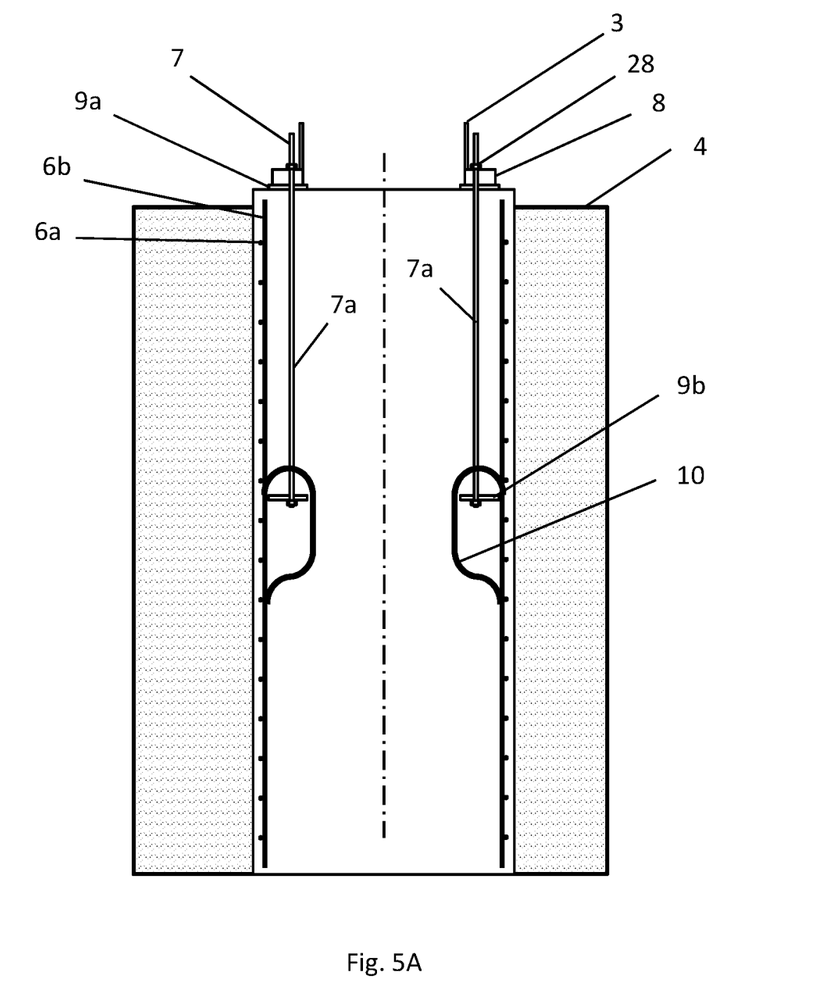
FIG. 5A shows a cross-sectional side view of one of the piles of FIG. 2A, following the axis of symmetry of the pile, anchored to the corresponding column of the wind turbine once the assembly process has ended, but without depicting the concrete.
Figure 5B:
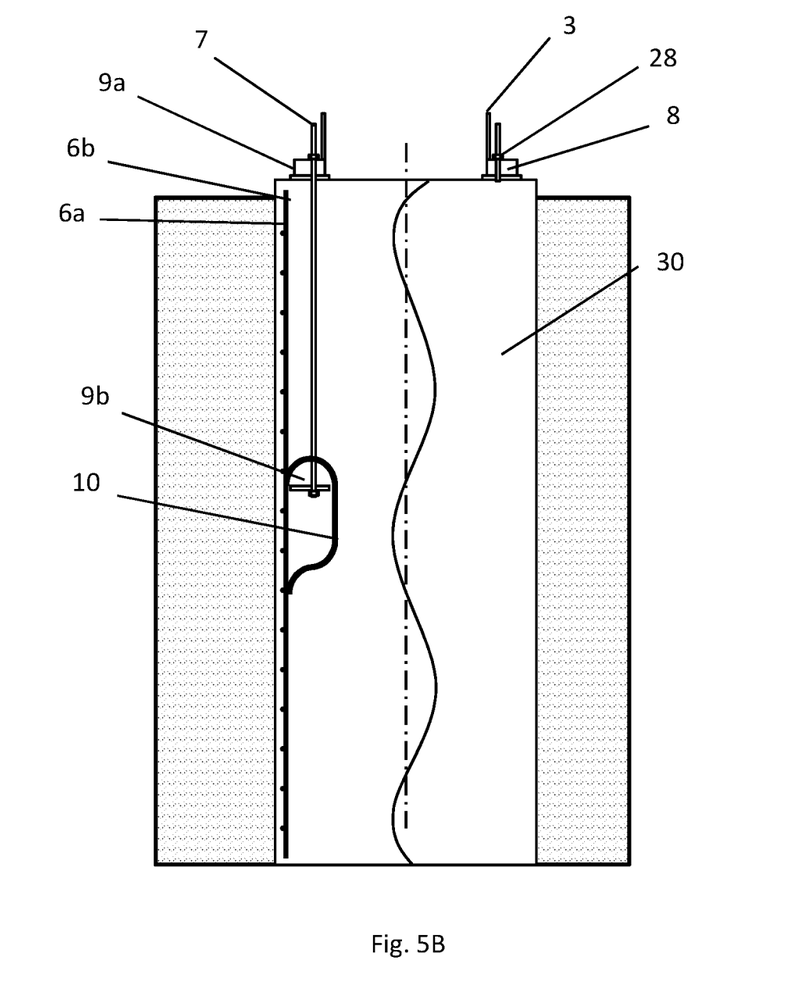
FIG. 5B shows a partial cross-section of the pile of FIG. 5A with the main reinforcement and bolt cage encased in concrete.
Figure 6B:
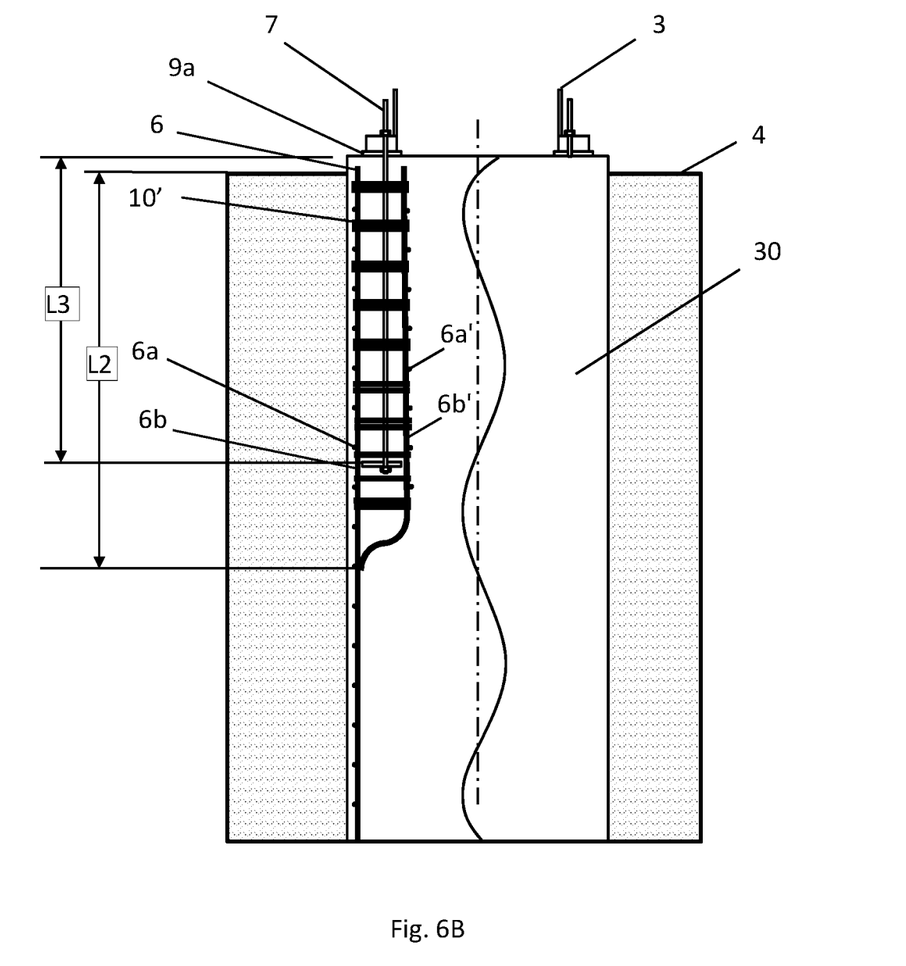
FIG. 6B shows a partial cross-section of the pile of FIG. 6A with the main reinforcement, secondary reinforcement and bolt cage encased in concrete.

FIG. 5A shows a section, following the axis of symmetry, of the pile 5 and its corresponding column 3 according to one embodiment. The arrangement between the bolt cage 7 and the main reinforcement 6 once the assembly process has ended, with the ties 10 attaching the bolt cage 7 to the main reinforcement 6.

As can be seen in FIG. 5A, the upper portion of the pile 5 protrudes from the level of the ground 4 to prevent moisture of the terrain and minimize corrosion in the attachment.

In a variant of the method, before pouring of the concrete 30 the secondary reinforcement 6' is introduced into holes 40 simultaneously with the introduction of the main reinforcement 6 with the bolt cage 7 being arranged between both reinforcement 6 and 6', as shown in FIG. 6A. In this embodiment, the main reinforcement 6 and the secondary reinforcement 6' may be physically attached through joining ties 10'. The joining ties 10' are preferably arranged horizontally, and can be arranged alone or in pairs, as shown in FIG. 6A. The joining ties 10' are arranged between the vertical bars 6b, 6b' of the main reinforcement 6 and the secondary reinforcement 6', preferably equidistantly spaced.

With the intention of making easier the assembly of the main reinforcement 6 and the secondary reinforcement 6' and the bolt cage 7, these three elements can be previously attached together. This attachment can be performed outside the hole 40, as a pre-assembly, which allows introducing simultaneously the entire assembly into the hole before pouring the concrete 30. According to one embodiment the joining ties 10' hold together the vertical bars 6b, 6b' of the main reinforcement 6 and the secondary reinforcement 6' and the ties 10 hold the bolt cage 7 attached to the main reinforcement 6 or the secondary reinforcement 6', or to both. Optionally, the joining ties 10' or the ties 10 may comprise welding points to produce the attachment.

The clauses below represent embodiments of a wind turbine tower foundation and embodiments of constructing a wind turbine tower foundation.

Clause 1: A foundation for a tower of a wind turbine, which tower is formed by a tubular upper portion 2 and a lower portion made up of at least three columns 3, the foundation comprises one reinforced concrete pile 5 for each column 3, inside each pile 5 being arranged a bolt cage 7 and a main reinforcement 6 formed by horizontal rings 6a and vertical bars 6b attached to one another forming a cylindrical framework, said main reinforcement 6 being arranged on the periphery of the corresponding pile 5 and bolt cage 7 being arranged in the upper portion of the inside of the corresponding main reinforcement 6, and radially at a distance of less than 0.1 meters so that when the concrete sets it is possible to transmit in use the tensile loads generated by the tower from the bolt cage 7 to the main reinforcement 6 and finally to the concrete, each bolt cage 7 being suitable for going through a flange 8 of the column 3.

Clause 2: The foundation according to clause 1, wherein inside each bolt cage 7 there is arranged a secondary reinforcement 6' formed by vertical bars 6b and horizontal rings 6a' that form a cylindrical framework.

Clause 3: The foundation according to clause 2, wherein the secondary reinforcement 6' is arranged radially at a distance of less than 0.1 meters from the bolt cage 7.

Clause 4: The foundation according to clause 2 or 3, wherein the secondary reinforcement 6' comprises a height/length greater than the portion of the bolt cage 7 that is embedded inside the concrete, preferably of the order of 0.5 meters higher.

Clause 5: The foundation according to any of clauses 2 to 4, wherein the main reinforcement 6 and the secondary reinforcement 6' are attached by joining ties 10' being arranged between the vertical bars 6b, 6b' of the main reinforcement 6 and the secondary reinforcement 6'.

Clause 6: The foundation according to any of the preceding clauses, wherein each bolt cage 7 is physically attached to the framework of the main reinforcement 6 of the corresponding pile 5 by ties 10 which are fixed between the framework of horizontal rings 6a and vertical bars 6b making up the main reinforcement 6 and a lower collar 9b of bolt cage 7.

Clause 7: The foundation according to any of the preceding clauses, wherein each bolt cage 7 comprises an upper collar 9a protruding at the level of the ground 4 and in direct contact with the upper portion of the pile 5, said upper collar 9a being suitable for also being in direct contact with the flange 8 of the column 3.

Clause 8: The foundation according to clause 7, wherein the upper collar 9a comprises through holes 11 arranged at 60° suitable for arranging leveling elements that interact with all the adjacent bolt cages 7 during assembly of the piles 5.

Clause 9: The foundation according to any of the preceding clauses, wherein the bolt cage 7 has a height/length in a range between 0.8 and 2 meters and the main reinforcement 6 has a height/length in a range between 20 and 40 meters.

Clause 10: A method of constructing a foundation according to any of the preceding clauses, the method comprising:
  a hole for each pile 5 is drilled in the ground 4,
  a main reinforcement 6 is introduced for each pile 5 extending around the contour of the hole covering its entire depth by means of a cylindrical framework of horizontal rings 6a and vertical bars 6b,
  a bolt cage 7 is introduced in the upper portion of the reinforcement of each pile 5 such that an upper collar 9a comprised in said bolt cage 7 protrudes from the level of the ground 4,
  the position of the bolt cages 7 is coordinated by leveling elements that interact with the upper collars 9a and which are arranged at 60° from one another,
  concrete is poured in each hole of each pile 5, and
  once the concrete has set, the attachment between the upper portion of the upper collar 9a of each bolt cage 7 protruding from the ground 4 and the flange 8 of the corresponding column 3 of the tower is completed.

Clause 11: The method according to clause 10, wherein the bolt cage 7 and the main reinforcement 6 of each pile 5 are attached through a tie 10 attaching the framework of horizontal rings 6a and vertical bars 6b with the lower collar (9b), thus allowing the main reinforcement 6 and the bolt cage 7 to be introduced together into the corresponding hole of the ground.

Clause 12: The method according to clauses 10 or 11, wherein a secondary reinforcement 6' is introduced simultaneously with the main reinforcement 6, which are preferably previously attached by joining ties 10', and then the bolt cage 7 is introduced between both assemblies 6, 6'.

Clause 13: The method according to clause 12, wherein the main reinforcement 6, the secondary reinforcement 6' and the bolt cage 7 are attached to each other outside the hole of the ground so that allowing the whole assembly to be introduced together into the corresponding hole.

Clause 14: The method according to any clauses 10 to 13, said method also comprising an operation for removing leveling elements that interact with all the upper collars 9a of the adjacent bolt cages 7 once the concrete has set.

Clause 15: The method according to any of clauses 10 to 14, wherein the main reinforcement 6 of each pile 5 comprises two portions, a lower half and an upper half, such that
first the lower half and then the upper half of the main reinforcement 6 are introduced in the hole of each pile 5, and
before completely introducing the lower half in the hole of the corresponding pile 5, the upper half is attached to the lower half, preferably by welding or any other type of equivalent permanent attachment, such that the entire reinforcement is attached together forming a single part.

What is claimed is:

1. A foundation for a tower of a wind turbine, the tower including three columns that each has a bottom end flange, the foundation comprising:
    a reinforced concrete pile for each of the three columns, the reinforced concrete pile residing in a hole in the ground and comprising:
        a main reinforcement formed by a first plurality of horizontal rings and a first plurality of vertical bars attached to one another forming a first cylindrical framework, the main reinforcement being arranged near a periphery of the pile;
        a bolt cage arranged inside an upper portion of the first cylindrical framework, the bolt cage including a plurality of vertically oriented threaded bars positioned a radial distance of less than 0.1 meters away from the cylindrical framework; and
        concrete in which the main reinforcement and bolt cage are encased, each of the plurality of vertically oriented threaded bars having an upper end portion that protrudes upward from a top surface of the concrete that is configured to pass through the bottom end flange of the column, the positioning of the bolt cage in relation to the main reinforcement inside the concrete enabling tensile loads generated by the tower to be transferred from the bolt cage to the main reinforcement and from the main reinforcement to the concrete.

2. The foundation according to claim 1, further comprising a secondary reinforcement formed by a second plurality of horizontal rings and a second plurality of vertical bars attached to one another forming a second cylindrical framework, the second cylindrical framework being located encased in the concrete inside the first cylindrical framework.

3. The foundation according to claim 2, wherein the plurality of vertically oriented threaded bars of the bolt cage are positioned a radial distance of less than 0.1 meters away from the second cylindrical framework.

4. The foundation according to claim 2, wherein the secondary reinforcement has a first length, and a portion of the bolt cage encased in the concrete has a second length, the first length being greater than the second length.

5. The foundation according to claim 2, wherein the main reinforcement and the secondary reinforcement are attached by joining ties arranged between the vertical bars of the main reinforcement and the vertical bars of the secondary reinforcement.

6. The foundation according to claim 1, wherein the bolt cage includes a lower collar encased in the concrete through which the plurality of vertically oriented threaded bars pass, the first cylindrical framework being attached to the lower collar of the bolt cage by ties.

7. The foundation according to claim 1, wherein the bolt cage comprises an upper collar located outside the concrete through which the plurality of vertically oriented threaded bars pass, the upper collar configured to be attached to the bottom end flange of the column.

8. The foundation according to claim 7, wherein the upper collar comprises through holes arranged 60 degrees part from one another and configured to receive leveling elements that extend between the piles.

9. The foundation according to claim 1, wherein the bolt cage has a length in a range between 0.8 and 2 meters and the main reinforcement has a length in a range between 20 and 40 meters.

10. A method of constructing a foundation, the method comprising:
    forming first, second and third vertical holes in the ground, each of the first second and third vertical holes having a depth;
    inserting a first, second and third main reinforcement respectively inside each of the first, second and third vertical holes, each of the first, second and third main reinforcements being formed by a plurality of horizontal rings and a plurality of vertical bars attached to one another forming respective first, second and the third cylindrical frameworks that respectively extend around a contour of the first, second and third vertical holes, each of the first, second and third main reinforcements having a length that extends along an entire depth of the respective first, second and third vertical holes;
    installing a first, second and third bolt cage inside an upper portion of the respective first, second and third main reinforcements, each of the first, second and third bolt cages respectively including a first, second and third upper collar, the first, second and third bolt cages being arranged such that each of the first, second and third upper collars protrude from a level of the ground;
    with the use of first, second and third leveling elements extending between the first, second and third upper collars and arranged 60 degrees from one another, arranging the first second and third bolt cages so that the first, second and third upper collars are level with one another; and
    after the first, second and third upper collars are level with one another, pouring concrete into each of the first, second and third vertical holes to encase the first, second and third main reinforcement and first, second and third bolt cage inside the respective first, second and third vertical holes.

12. The method of constructing a foundation according to claim 10, further comprising:
coupling the first, second and third bolt cages respectively to the first, second and third main reinforcements by respective first, second and third ties;
inserting together the first main reinforcement and first bolt cage into the first vertical hole;
inserting together the second main reinforcement and second bolt cage into the second vertical hole; and
inserting together the third main reinforcement and third bolt cage into the second vertical hole.

12. The method of constructing a foundation according to claim 11, wherein each of the first, second and third bolt cages respectively includes first, second and third lower collars, the method comprising coupling the first cylindrical framework to the first lower collar by use of the first tie, coupling the second cylindrical framework to the second lower collar by use of the second tie and coupling the third cylindrical framework to the third lower collar by use of the third tie.

13. The method of constructing a foundation according to claim 10, further comprising inserting first, second and third secondary reinforcements respectively inside the first, second and third main reinforcement prior to the pouring of the concrete.

14. The method of constructing a foundation according to claim 10, further comprising coupling each of the first, second and third secondary reinforcements respectively to the first, second and third main reinforcement by use of one or more ties and simultaneously inserting the first main reinforcement and first secondary reinforcement into the first vertical hole, simultaneously inserting the second main reinforcement and second secondary reinforcement into the second vertical hole, and simultaneously inserting the third main reinforcement and third secondary reinforcement into the third vertical hole.

15. The method of constructing a foundation according to claim 14, further comprising:
inserting the first bolt cage between the first main reinforcement and first secondary reinforcement;
inserting the second bolt cage between the second main reinforcement and second secondary reinforcement; and
inserting the third bolt cage between the third main reinforcement and third secondary reinforcement.

16. The method of constructing a foundation according to claim 15, wherein:
the first main reinforcement, first secondary reinforcement and first bolt cage are attached to one other outside the first vertical hole and thereafter simultaneously inserted into the first vertical hole;
the second main reinforcement, second secondary reinforcement and second bolt cage are attached to one other outside the second vertical hole and thereafter simultaneously inserted into the second vertical hole; and
the third main reinforcement, third secondary reinforcement and third bolt cage are attached to one other outside the third vertical hole of the ground and thereafter simultaneously inserted into the third vertical hole.

17. The method of constructing a foundation according to claim 15, wherein:

the first bolt cage includes an upper collar, a lower collar and a first plurality of vertical threaded bars that extend between the upper and lower collars of the first bolt cage, the first bolt cage being arranged such that the first plurality of vertical threaded bars are spaced a distance of less than 0.1 meters away from each of the first main reinforcement and first secondary reinforcement;
the second bolt cage including an upper collar, a lower collar and a second plurality of vertical threaded bars that extend between the upper and lower collars of the second bolt cage, the second bolt cage being arranged such that the second plurality of vertical threaded bars are spaced a distance of less than 0.1 meters away from each of the second main reinforcement and second secondary reinforcement; and
the third bolt cage including an upper collar, a lower collar and a third plurality of vertical threaded bars that extend between the upper and lower collars of the third bolt cage, the third bolt cage being arranged such that the third plurality of vertical threaded bars are spaced a distance of less than 0.1 meters away from each of the third main reinforcement and third secondary reinforcement.

18. The method of constructing a foundation according to claim 10, further comprising removing the first, second and third leveling elements extending between the first, second and third upper collars after a setting of the concrete.

19. The method of constructing a foundation according to claim 10, wherein each of the first, second and third main reinforcements includes a lower half portion and an upper half portion, the method further comprising:
partially introducing the lower half of the first main reinforcement into the first vertical hole and then coupling the upper half of the first main reinforcement to the lower half of the first main reinforcement outside the first vertical hole,
partially introducing the lower half of the second main reinforcement into the second vertical hole and then coupling the upper half of the second main reinforcement to the lower half of the first main reinforcement outside the second vertical hole,
partially introducing the lower half of the third main reinforcement into the third vertical hole and then coupling the upper half of the third main reinforcement to the lower half of the third main reinforcement outside the third vertical hole.

20. The method of constructing a foundation according to claim 10, wherein:
the first bolt cage includes an upper collar, a lower collar and a first plurality of vertical threaded bars that extend between the upper and lower collars of the first bolt cage, the first bolt cage being arranged such that the first plurality of vertical threaded bars are spaced a distance of less than 0.1 meters away from the first cylindrical framework;
the second bolt cage including an upper collar, a lower collar and a second plurality of vertical threaded bars that extend between the upper and lower collars of the second bolt cage, the second bolt cage being arranged such that the second plurality of vertical threaded bars are spaced a distance of less than 0.1 meters away from the second cylindrical framework; and
the third bolt cage including an upper collar, a lower collar and a third plurality of vertical threaded bars that extend between the upper and lower collars of the third bolt cage, the third bolt cage being arranged such that the third plurality of vertical threaded bars are spaced a distance of less than 0.1 meters away from the third cylindrical framework.

\* \* \* \* \*